(12) United States Patent
Dowd et al.

(10) Patent No.: US 7,024,081 B2
(45) Date of Patent: Apr. 4, 2006

(54) FIBER OPTIC CABLE FOR USE IN HARSH ENVIRONMENTS

(75) Inventors: Edward M. Dowd, Madison, CT (US); Milton E. Ives, Jr., South Windsor, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 218 days.

(21) Appl. No.: 10/422,396

(22) Filed: Apr. 24, 2003

(65) Prior Publication Data

US 2004/0213529 A1    Oct. 28, 2004

(51) Int. Cl.
*G02B 6/44* (2006.01)

(52) U.S. Cl. .............. 385/109; 385/113; 385/111; 367/25; 367/35; 166/351

(58) Field of Classification Search ........ 385/100–113; 166/351; 367/25, 35
See application file for complete search history.

(56) References Cited

U.S. PATENT DOCUMENTS

| | | | |
|---|---|---|---|
| 4,183,621 A | 1/1980 | Kao et al. ............... 350/96.3 |
| 4,435,238 A * | 3/1984 | Smith ........................ 156/171 |
| 4,477,147 A | 10/1984 | Winter et al. ........... 350/96.23 |
| 4,568,144 A * | 2/1986 | Occhini et al. ............ 385/107 |
| 4,579,420 A | 4/1986 | Winter et al. ........... 350/96.23 |
| 4,718,747 A | 1/1988 | Bianchi et al. ......... 350/96.23 |
| 4,725,122 A | 2/1988 | Anelli et al. ............ 350/96.23 |
| 4,745,238 A | 5/1988 | Kotthaus et al. |
| 4,756,596 A | 7/1988 | Ona et al. ................ 350/96.23 |
| 4,798,443 A | 1/1989 | Knipe et al. |
| 4,859,024 A * | 8/1989 | Rahman ..................... 385/112 |
| 5,199,096 A | 3/1993 | Kathiresan et al. ......... 385/109 |
| 5,455,881 A | 10/1995 | Bosisio et al. ............. 385/100 |
| 5,862,284 A | 1/1999 | Paborn et al. |
| 5,917,978 A | 6/1999 | Rutterman ................. 385/109 |
| 6,404,961 B1 * | 6/2002 | Bonja et al. ............... 385/109 |
| 2002/0126969 A1 | 9/2002 | Bonja et al. |

FOREIGN PATENT DOCUMENTS

| | | |
|---|---|---|
| DE | 19602117 | 7/1997 |
| FR | 2 803 666 | 7/2001 |
| JP | 3144403 | 6/1991 |
| JP | 11174293 | 7/1999 |

OTHER PUBLICATIONS

U.K. Search Report, Application No. GB0408814.2, dated Sep. 22, 2004.

* cited by examiner

*Primary Examiner*—Brian Healy
*Assistant Examiner*—Eric Wong
(74) *Attorney, Agent, or Firm*—Patterson & Sheridan, L.L.P.

(57) ABSTRACT

Fiber optic cables suitable for use in harsh environments such as down hole oil and gas well applications and methods for fabricating the same have been provided. In one embodiment, an optic cable suitable for down hole oil field applications comprises one or more optical fibers disposed in an inner tube and a corrosion resistant metal outer tube disposed over the inner tube, where the inner and outer tubes make intermittent contact. In another embodiment, an optic cable suitable for down hole oil field applications comprise one or more optical fibers disposed in a polymer tube having fins extending therefrom.

21 Claims, 7 Drawing Sheets

FIBER OPTIC CABLE FOR USE IN HARSH ENVIRONMENTS

BACKGROUND OF THE INVENTION

1. Field of the Invention

Embodiments of the invention generally relate to fiber optic cables for use in harsh environments such as down hole gas and oil well applications.

2. Background of the Related Art

With advancements in the area of fiber optic sensors for use in harsh environments, there is an increasing need for fiber optic cables compatible with the harsh environmental conditions present in down hole oil and gas well applications. For example, fiber optic cables utilized in down hole sensing applications must be able to operate reliably in conditions that may include temperatures in excess of 300 degrees Celsius, static pressures in excess of 20,000 pounds per square inch (psi), vibration, corrosive chemistry and the presence of high partial pressures of hydrogen. As the sensors utilized in down hole applications may be positioned at depths up to and exceeding 20,000 feet, the fiber optic cable coupled thereto must be designed to support the optical fiber contained therein without subjecting the optical fiber to the strain associated with the weight of a long fiber suspended in a vertical orientation within a well without disadvantageously effecting the fiber's optical performance.

FIG. 7 depicts one example of a conventional fiber optic cable 700 suitable for use in harsh environments such as down hole oil and gas well applications. A similarly suitable cable is described in U.S. Pat. No. 6,404,961, issued Jun. 11, 2002 to Bonja, et al., which is hereby incorporated by reference in its entirety. Suitable cables are also available from Weatherford, Inc., located in Houston, Tex. The fiber optic cable 700, shown in FIG. 7, includes a fiber in metal tube (FIMT) core 702 surrounded by an outer protective sleeve 704. The FIMT core 702 includes an inner tube 706 surrounding one or more optical fibers 708. Three optical fibers 708 are shown disposed within the inner tube 706 in the embodiment of FIG. 7. A filler material 710 is disposed in the inner tube 706 to fill the void spaces not occupied by the optical fibers 708. The filler material 710 may also include a hydrogen absorbing/scavenging material to minimize the effects of hydrogen on the optical performance of the fiber 708. At least one of the inner or outer surface of the inner tube 706 is coated or plated with a low hydrogen permeability material 716 to minimize hydrogen diffusion into the area which in the optical fibers 708 are disposed.

The outer protective sleeve 704 includes a buffer material 712 and an outer tube 714. The buffer material 712 provides a mechanical link between the inner tube 706 and the outer tube 714 to prevent the inner tube 706 from sliding within the outer tube 714. Additionally, the buffer material 712 keeps the inner tube 706 generally centered within the outer tube 714 and protects the inner tube 706 and coatings formed thereon from damage due to vibrating against the outer tube 714.

Although this cable design has shown itself to be a robust and reliable means for providing transmission of optical signals in harsh environments such as oil and gas wells, the cable is one of the higher cost contributors to the overall cost of down hole sensing systems. Additionally, as the diameter of the cable is typically about one-quarter inch, the length of cable that may be transported on a spool using conventional means is limited to about 20,000 feet of cable. Thus, in many down hole well applications, only a single sensor may be coupled to a length of cable coming off a single spool, as the residual length of cable on the spool is not long enough for another down hole application without splicing on an addition cable segment. As cost is primary advantage of conventional metal conductor sensing systems over optical systems, a more cost effective optic cable suitable for down hole oil well service is highly desirable.

Therefore, there is a need for an improved fiber optic cable for use in harsh environments.

SUMMARY OF THE INVENTION

Fiber optic cables suitable for use in harsh environments such as down hole oil and gas well applications and methods for fabricating the same are provided. In one embodiment, an optic cable suitable for down hole oil field applications comprises one or more optical fibers disposed in an inner tube. A corrosion resistant metal outer tube is disposed over the inner tube, where the inner and outer tubes make intermittent contact. In another embodiment, an optic cable suitable for down hole oil field applications comprise one or more optical fibers disposed in a polymer tube having fins extending therefrom.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
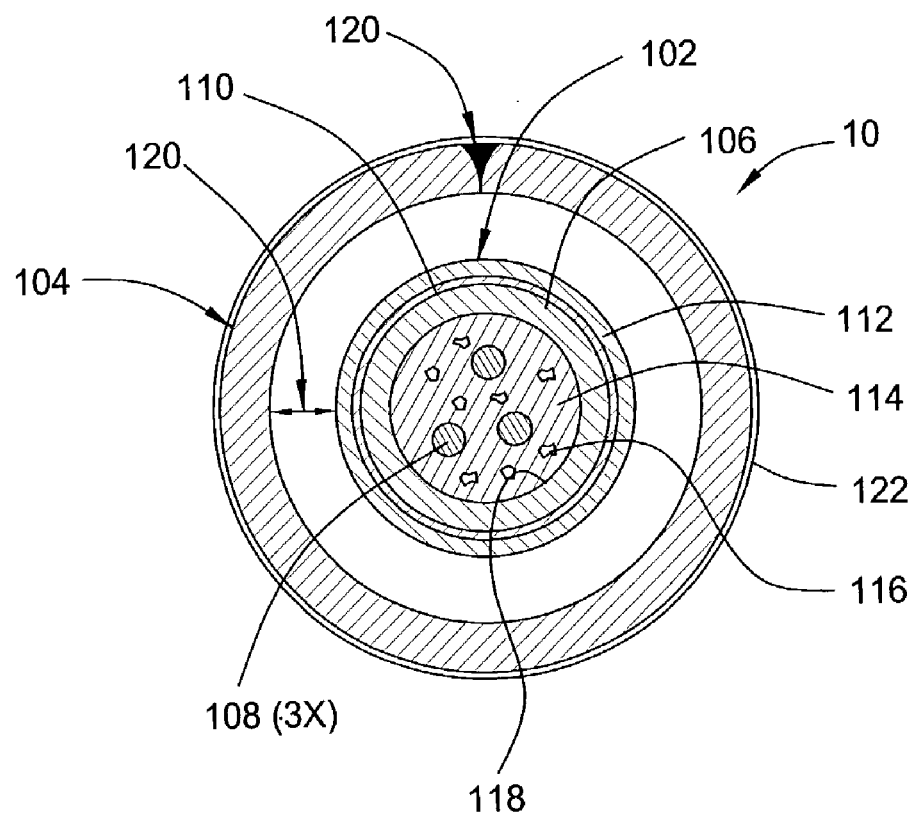
FIG. 1 is a cross sectional view of one embodiment of a fiber optic cable suitable for use in down hole oil and gas well applications.

FIG. 1 is one embodiment of a fiber optic cable 100 suitable for use in down hole oil and gas well applications. The cable 100 comprises a fiber in metal tube (FIMT) core 102 disposed in a protective outer tube 104. The FIMT 102 comprises an inner tube 106 surrounding one or more optical fibers 108, three of which are shown in the embodiment depicted in FIG. 1.

The inner tube 106 is fabricated from a corrosion resistant material. Examples of suitable corrosion resistant metal alloys include, but are not limited to, 304 stainless steel, 316 stainless steel, INCONEL® 625 and INCOLOY® 825, among others. Examples of suitable plastics include, but are not limited to fluoropolymers, ethylene-chlorotrifluoroethylene, fluoroethylenepropylene, polyvinylidene fluoride, polyvinylchoride, HALAR®, TEFLON® and TEFZEL®, among others. The diameter of the inner tube 106 may be in the range of about 1.1 to about 2.6 mm, and in an exemplary embodiment of the invention is about 2.4 mm. Although the inner tube 106 is described as being about 1.1 to about 2.6 mm in diameter, the diameter of the inner tube 106 may vary, depending upon the materials used and the number of optical fibers 108 to be placed in the inner tube 106.

In one embodiment, the inner tube 106 has a wall thickness suitable for a seam welding process utilized to fabricate the tube from a coil of metal strip. For example, the wall thickness of the 304 stainless steel inner tube 106 may be about 0.2 mm to facilitate a continuous laser weld during a tube forming process. In another embodiment, the inner tube 106 has a wall thickness suitable for fabrication by plastic extrusion.

An optional plated barrier coating 110 may be disposed on at least one of the inner or outer surfaces of the inner tube wall. The barrier coating 110 may be coated, plated or otherwise adhered to the inner tube 106 and may be comprised of a low hydrogen permeability material, such as tin, gold, carbon, or other suitable material. The thickness of the barrier coating 110 is selected to slow the diffusion of hydrogen into the center of the inner tube 106 driven by a high partial pressure hydrogen environment present in some wells. Depending upon the barrier coating material, the coating thickness may be in the range of about 0.1 to about 30 microns or thicker. For example, a carbon barrier coating 110 may have a thickness of about 0.1 microns, while a tin barrier coating 110 may have a thickness of approximately 13 microns. In one embodiment, the barrier coating 110 includes a nickel seed layer disposed on the tube surface that provides an adhesion layer for an outer layer of low hydrogen permeability material. In applications where high partial pressures of hydrogen are not expected, the barrier coating 110 may be omitted.

In one embodiment, a protective outer coating 112 is disposed over the barrier coating 110. The outer coating 112 is a protective layer of hard, scratch resistant material, such as nickel or a polymer such as polyamide, among others, that substantially prevents the barrier coating 110 from damage from contact with the outer tube 104. The outer coating 112 may have a thickness in the range of about 0.5 to about 15 microns, depending on the selected material.

A filler material 114 is disposed in the inner tube 106 and substantially fills the void spaces within the inner tube 106 surrounding the optical fibers 108 to supports and prevents the optical fibers 108 from moving excessively within the inner tube 106. The filler material 114 has sufficient viscosity to resist the shear forces applied to it as a result of the weight of the optical fiber 108 when disposed in a vertical well installation at elevated temperatures, thereby supporting the optical fibers 108 without subjecting the fibers to the strain of their weight. The filler material 114 has an operating temperature range of about 10 to about 200 degrees Celsius. However, the cable 100 may be utilized over a wider temperature range.

The filler material 114 is also configured to allow the optical fibers 108 to relax and straighten with respect to the inner tube 106 due to differences in the coefficients of thermal expansion between the optical fiber 108 and the inner tube 106 and during spooling, deployment and use of the cable 100. The filler material 114 also prevents chaffing of the coatings on the optical fibers 108 as a result of bending action during installation and vibration of the cable 100. The filler material 114 also serves as cushion the optical fiber 108 against the surface of the inner tube 106 to avoid microbend losses across cable bends. Suitable filler 114 materials include conventional thixotropic gels or grease compounds commonly used in the fiber optic cable industry for water blocking, filling and lubrication of optical fiber cables. Optionally, the filler material 114 may be omitted.

To further reduce the effects of hydrogen on the optical fibers 108, the filler material 114 may optionally include or be impregnated with a hydrogen absorbing/scavenging material 116, such as palladium or tantalum, and the like. In one embodiment, the hydrogen absorbing/scavenging material 116 is a vanadium-titanium wire coated with palladium. Alternatively, the inner tube 106 may be coated with a hydrogen absorbing/scavenging material below the barrier coating 110 or on the interior surface 118 of the inner tube 106, or such a hydrogen absorbing/scavenging material may be impregnated into the tube material, or any combination of the above.

The optical fibers 108 are selected to provide reliable transmission of optical signals through the cable 100 disposed in a down hole gas or oil well application. Suitable optical fibers 108 include low defect, pure silica core/depressed clad fiber. Alternatively, suitable optical fibers 108 include germanium doped single mode fiber or other optical fiber suitable for use in a high temperature environment. The optical fibers 108 disposed within the inner tube 106 may be comprised of the same type or of different types of materials. Although the invention is described herein as using three optical fibers 108 within the inner tube 106, it contemplated that one or more fibers 108 may be used. The total number of fibers 108 and the diameter of the inner tube 106 are selected to provide sufficient space to prevent microbending of the optical fibers 106 during handing and deployment of the cable 100.

As the fiber optic cable 100 has an operating temperature ranging at least between about 10 to about 200 degrees Celsius, a greater length of optical fibers 108 are disposed per unit length of inner tube 106 to account for the different coefficient of thermal expansion (CTE) represented by the optical fibers 108 and the inner tube 106. The inner tube diameter is configured to accept an excess length of "serpentine over-stuff" of optical fiber 108 within the inner tube 106. In one embodiment, the excess length of optical fiber 108 may be achieved by inserting the fiber 108 while the inner tube 106 is at an elevated temperature, for example, during laser welding of the inner tube 106. The temperature of the inner tube 106 is controlled such that it approximates the anticipated maximum of normal operating temperature of the final installation. This process will lead to an excess length of fiber 108 of up to 2.0 percent or more within the inner tube 106 cooling of the inner tube.

The FIMT core 102 is surrounded by the outer tube 104 that is configured to provide a gap 120 therebetween. The gap 120 is filled with air or other non-structural material and provides sufficient isolation between the outer tube 104 and FIMT core 102 to prevent the various layers of the FIMT core 102 from excessively contacting the outer tube 104 and becoming damaged. As the FIMT core 102 and outer tube 104 are not retained relative one another, the serpentine orientation of the FIMT core 102 within the outer tube 104 (shown in FIG. 2) results in intermittent contact points 202 therebetween. The intermittent contact points 202 retain the inner tube 106 relative to the outer tube 104, thus creating enough friction to prevent the inner tube 106 from moving within the outer tube 104 and damaging the coatings applied to the exterior of the inner tube 106.

Returning to FIG. 1, the outer tube 104 is manufactured of a corrosion resistant material that easily diffuses hydrogen. The outer tube 104 may be manufactured of the same material of the inner tube 106 and may be fabricated with or without a coating of a low hydrogen permeability coating or hydrogen scavenging material. Examples of outer tube materials include suitable corrosion resistant metal alloys such as, but not limited to, 304 stainless steel, 316 stainless steel, INCONEL® 625 and INCOLOY® 825, among others.

In one embodiment, the outer tube 104 is seam welded over the FIMT core 106. The weld seam 120 of the outer tube 104 may be fabricated using a TIG welding process, a laser welding process, or any other suitable process for joining the outer tube 104 over the FIMT core 102.

After welding, the outer tube 104 is drawn down over the FIMT core 102 to minimize the gap 120. The gap 120 ensures that the outer tube 104 is not mechanically fixed to the FIMT core 102, thereby preventing thermally induced motion or strain during use at elevated temperatures and/or over temperature cycling, which may damage the barrier and/or outer coatings 110, 112 if the outer tube 104 were to slide over the inner tube 106.

Alternatively, the outer tube 104 may be rolled or drown down against the FIMT core 102, where care is taken not to extrude or stretch the FIMT core 102 such that the excess length of the fibers 108 within the FIMT core 102 is not appreciably shortened. In embodiments where the outer tube 104 and the FIMT core 102 are in substantially continuous contact, the inner and outer tubes 106, 104 may be fabricated from the same material to minimize differences in thermal expansion, thereby protecting the coating applied to the exterior of the inner tube 104.

An initial diameter of the outer tube 104 should be selected with sufficient space as not to damage the FIMT core 102 during welding. The outer tube 104 may be drawn down to a final diameter after welding. In one embodiment, the outer tube 104 has a final diameter of less than about 3/16 inch to less than about 1/4 inch and has a wall thickness in the range of about 0.7 to about 1.2 mm. Other outer tube diameters are contemplated and may be selected to provide intermittent mechanical contact between the inner tube 106 and the outer tube 104 to prevent relative movement therebetween.

To further protect the cable 100 during handling and installation, a protective jacket 122 of a high strength, protective material may be applied over the outer tube 104. For example, a jacket 122 of ethylene-chlorotrifluoroethylene (ECTFE) may be applied over the outer tube 104 to aid in the handling and deployment of the cable 100. In one embodiment, the jacket 122 may have a non-circular cross-section, for example, ellipsoid or irregular, or polygonal, such as rectangular. The protective jacket 122 may be comprised of other materials, such as fluoroethylenepropylene (FEP), polyvinylidene fluoride (PVDF), polyvinylchloride (PVC), HALAR®, TEFLON®, fluoropolymer, or other suitable material.

As the diameter of the outer tube 104 and optional protective jacket 122 result in a cable 100 that is much smaller than conventional designs, more cable 100 may be stored on a spool for transport. For example, a cable 100 having a diameter of about 1/8 inch may have a length of about 80,000 feet stored on a single spool, thereby allowing multiple sensing systems to be fabricated from a single length of cable without splicing. Furthermore, the reduced diameter of the cable 100 allows for more room within the well head and well bore, thereby allowing more cables (or other equipment) to be disposed within the well. Moreover, as the cable 100 is lighter and has a tighter bending radius than conventional designs, the cable 100 is easier to handle and less expensive to ship, while additionally easier to deploy efficiently down the well. For example, conventional quarter inch diameter cables typically have a bending radius of about 4 inches, while an embodiment of the cable 100 having an eighth inch diameter has a bending radius of less than 3 inches, and in another embodiment, to about 2 inches.

Figure 3A:
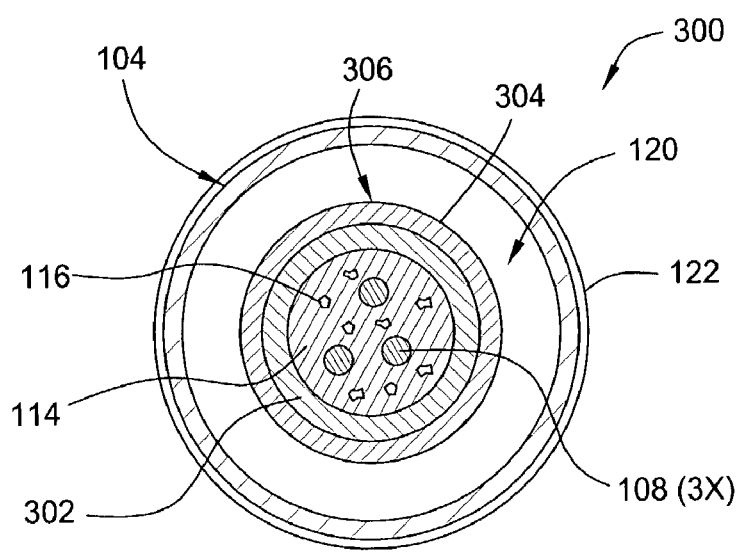
FIGS. 3A–E are cross sectional views of alternative embodiments of a fiber optic cable suitable for use in down hole oil and gas well applications.

FIG. 3A a cross sectional view of another embodiment of a fiber optic cable 300 suitable for use in down hole oil and gas well applications. The cable 300 is substantially similar in construction to the cable 100 described above, having an FIMT core 306 disposed within a protective outer tube 104.

The FIMT 306 comprises an inner metal tube 302 having a polymer shell 304 surrounding one or more optical fibers 108. The inner tube 302 is fabricated similar to the metal embodiment of the inner tube 302 described above, while the polymer shell 304 may be applied to the exterior of the inner tube 302 by extruding, spraying, dipping or other coating method. The polymer shell 304 may be fabricated from, but is not limited to fluoropolymers, ethylene-chlorotrifluoroethylene, fluoroethylenepropylene, polyvinylidene fluoride, polyvinylchoride, HALAR®, TEFLON® and TEFZEL®, among others. Although the polymer shell 304 is illustrated as a circular ring disposed concentrically over the inner tube 302, it is contemplated that the polymer shell 304 may take other geometric forms, such as polygonal, ellipsoid or irregular shapes.

An optional plated barrier coating (not shown) similar to the coating 110 described above, may be disposed on at least one of the inner or outer surfaces of at least one of the inner tube 302 or polymer shell 304. In one embodiment, a protective outer coating (also not shown) similar to the outer coating 112 described above, is disposed over the barrier coating 110. The outer coating 112 is a protective layer of hard, scratch resistant material, such as nickel or a polymer such as polyamide, among others, that substantially prevents the barrier coating 110 from damage from contact with the outer tube 104.

The optical fibers 108 are selected to provide reliable transmission of optical signals through the cable 300 disposed in a down hole gas or oil well application. Although the invention is described herein as using three optical fibers 108 within the inner tube 302, it contemplated that one or more fibers 108 may be used. The optical fibers 108 may be disposed in filler material 114 that substantially fills the void spaces within the inner tube 302 surrounding the optical fibers 108. The filler material 114 may optionally be impregnated with a hydrogen absorbing/scavenging material 116, such as palladium or tantalum, and the like.

The outer tube 104 is configured to intermittently contact the FIMT core 306 while substantially maintain a gap 120 as described above. The intermittent contact between the inner tube 302 and FIMT core 306 prevents the FIMT core 306 from moving within the outer tube 104 while advantageously minimizing the outer diameter of the cable 300 as compared to conventional designs.

Figure 3D:
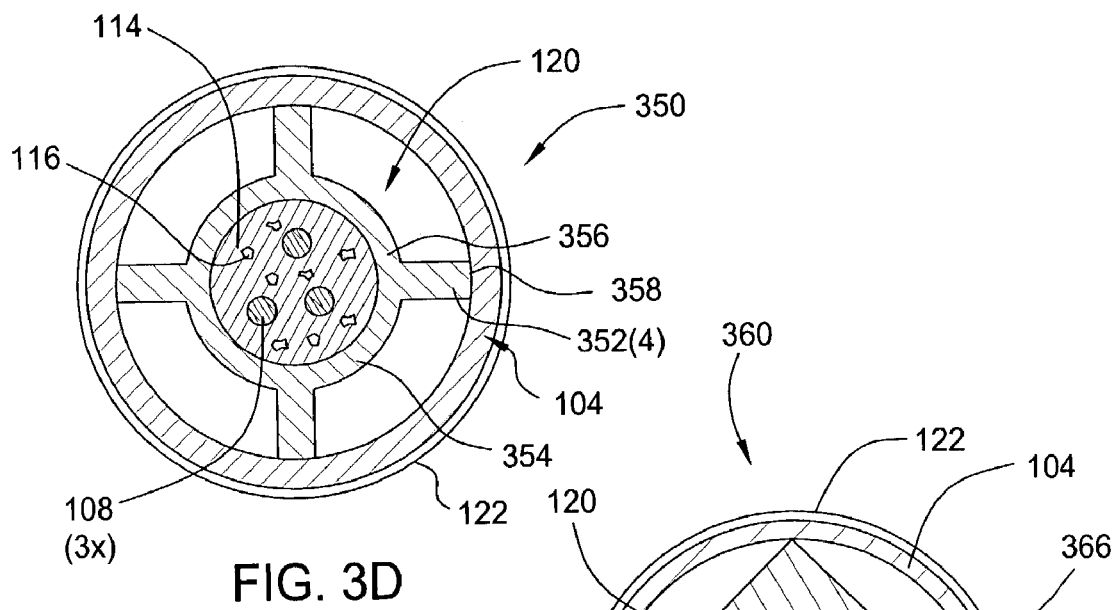
Figure 3E:
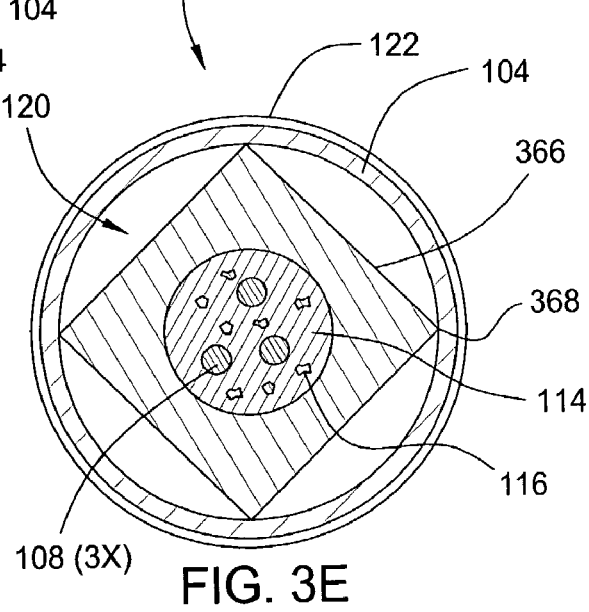
Figure 3C:
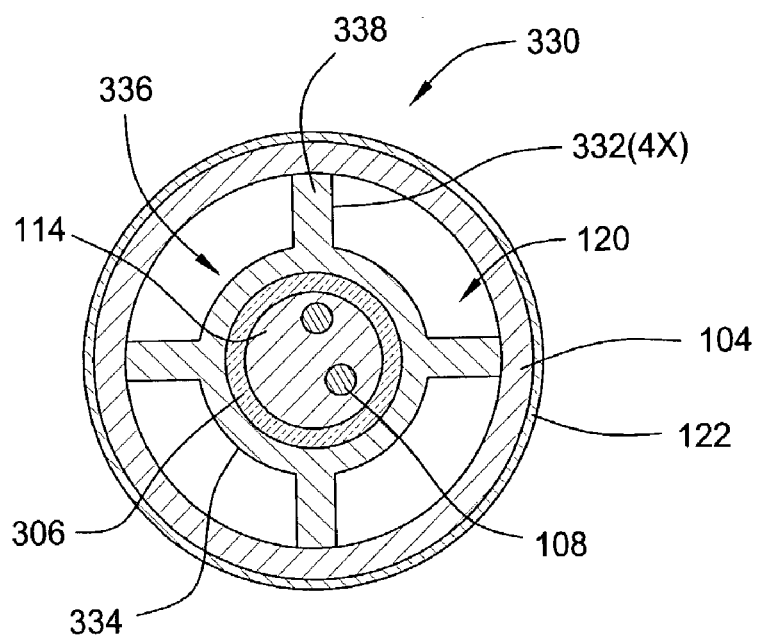
Figure 3B:
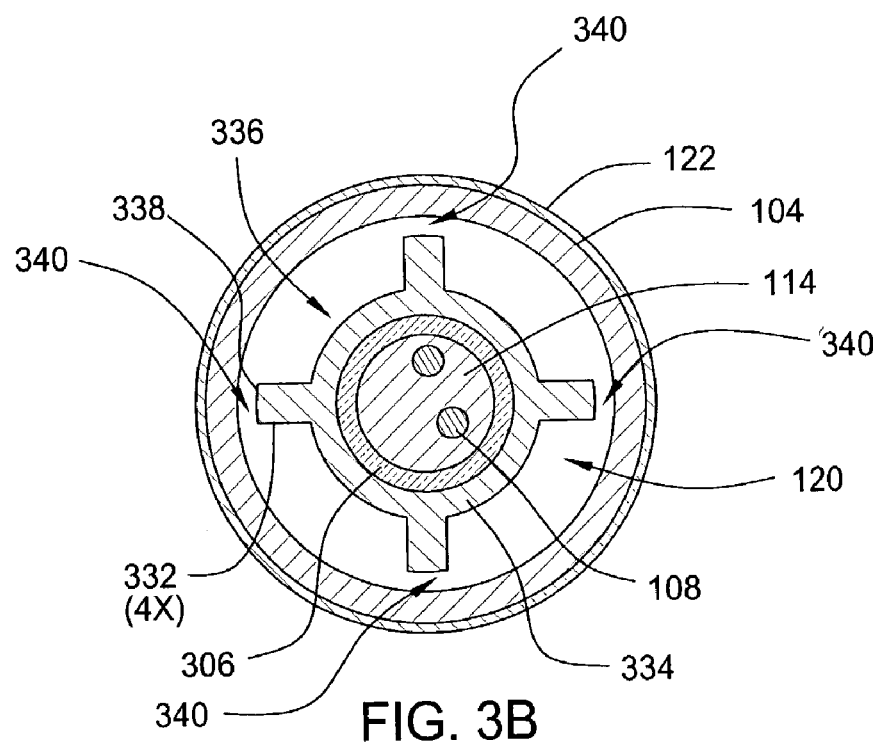

FIG. 3B depicts a cross sectional view of another embodiment of a fiber optic cable 330 suitable for use in down hole oil and gas well applications. The cable 330 is substantially similar in construction to the cable 300 described above, having an FIMT core 336 disposed within a protective outer tube 104, except that the FIMT core 336 includes a plurality of fins 332.

Figure 2:
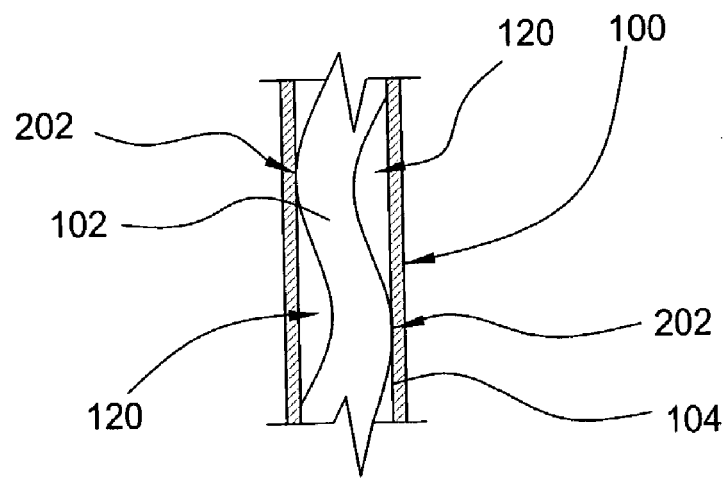
FIG. 2 is a partial sectional side view of the optic cable of FIG. 1.

In one embodiment, the FIMT core 336 includes an inner metal tube 302 having a polymer shell 334 disposed thereover. The fins 332 extend outwardly from the polymer shell 334. The fins 332 are typically unitarily formed with the shell 334 during an extrusion process, but may alternatively be coupled to the shell 334 through other fabrication processes. Ends 338 of the fins 332 generally extend from the shell 334 a distance configured to allow a gap 340 to be defined between the ends 338 and the wall of the outer tube 104. The gap 340 allows the FIMT core 336 to be disposed within the outer tube 104 in a serpentine orientation (similar to as depicted in FIG. 2), thereby allowing intermittent contact between the FIMT core 336 and the outer tube 104 that substantially secures the core 336 and outer tube 104 relative to one another.

Alternatively, as depicted in FIG. 3C, the outer tube 104 may be sized or drawn down to contact the fins 332 of the FIMT core 336, thus mechanically coupling the FIMT core 336 to the outer tube 104. In this embodiment, a gap 120 remains defined between the shell 334 and outer tube 104 to substantially protect the FIMT core 336 and any coatings disposed thereon, while the mechanical engagement of the tube 104 and fins 332 prevent movement of the core 336 within the tube 104. Moreover, the space defined between the fins 332 provides spacing between the FIMT core 336 and the outer tube 104 to prevent damage of the FIMT core 336 during welding. Additionally, the fins 332 may be slightly comprised during the reduction in diameter of the outer tube 104 so that the FIMT core 336 is not stretched or extruded in a manner that substantially removes the excess length of fiber within the FIMT core 336.

FIG. 3D depicts a cross sectional view of another embodiment of a fiber optic cable 350 suitable for use in down hole oil and gas well applications. The cable 350 is substantially similar in construction to the cable 330 described above, having an fiber in tube (FIT) core 356 disposed within a protective outer tube 104, except that the FIT core 356 includes a plurality of fins 352 extending from a polymer inner tube 354 that surrounds at least one optical fiber 108 without an intervening metal tube.

The fins 352 are unitarily formed with the polymer inner tube 354 during an extrusion process, but may alternatively be coupled to the inner tube 354 through other fabrication processes. During fabrication, the optical fiber 108 is disposed in the polymer inner tube 354 while the tube 354 is in an expanded state, for example, immediately after the polymer inner tube 354 is extruded or after heating the tube. As the polymer tube 354 cools and shrinks, the length of optical fiber 108 per unit length of polymer tube 354 increases, thereby allowing enough optical fiber 108 to be disposed within the polymer tube 354 to ensure minimal stress upon the optical fiber 108 after the polymer tube 354 has expanded when subjected to the hot environments within the well.

Ends 358 of the fins 352 generally extend from the polymer inner tube 354 a distance configured to allow a gap to be defined between the ends 358 and the wall of the outer tube 104 or to contact the outer wall 104 as shown. In either embodiment, a gap 120 remains defined between the polymer inner tube 354 and outer tube 104 to substantially protect the FIT core 356 and any coatings disposed thereon.

FIG. 3E depicts a cross sectional view of another embodiment of a fiber optic cable 360 suitable for use in down hole oil and gas well applications. The cable 360 is substantially similar in construction to the cable 350 described above, having an FIT core 366 disposed within a protective outer tube 104, except that the FIT core 366 includes a polymer inner tube 364 without fins that surrounds at least one optical fiber 108, and without an intervening metal tube.

The polymer inner tube 364 has a polygonal form, such as a triangle or polygon (a square is shown in the embodiment depicted in FIG. 3E). However, it is contemplated that the polymer inner tube 364 may take other geometric forms, such as polygonal, ellipsoid, circular or irregular shapes, where the polymer inner tube 364 has a different geometric shape than the inner diameter of the outer tube 104.

In the embodiment depicted in FIG. 3E, the polymer inner tube 364 includes corners 368 that generally extend from the polymer inner tube 364 a distance configured to allow a gap to be defined between the corners 368 and the wall of the outer tube 104 or to contact the outer wall 104 as shown. In either embodiment, a gap 120 remains defined between the polymer inner tube 364 and outer tube 104 to substantially protect the FIT core 366 and any coatings disposed thereon.

Figure 4:
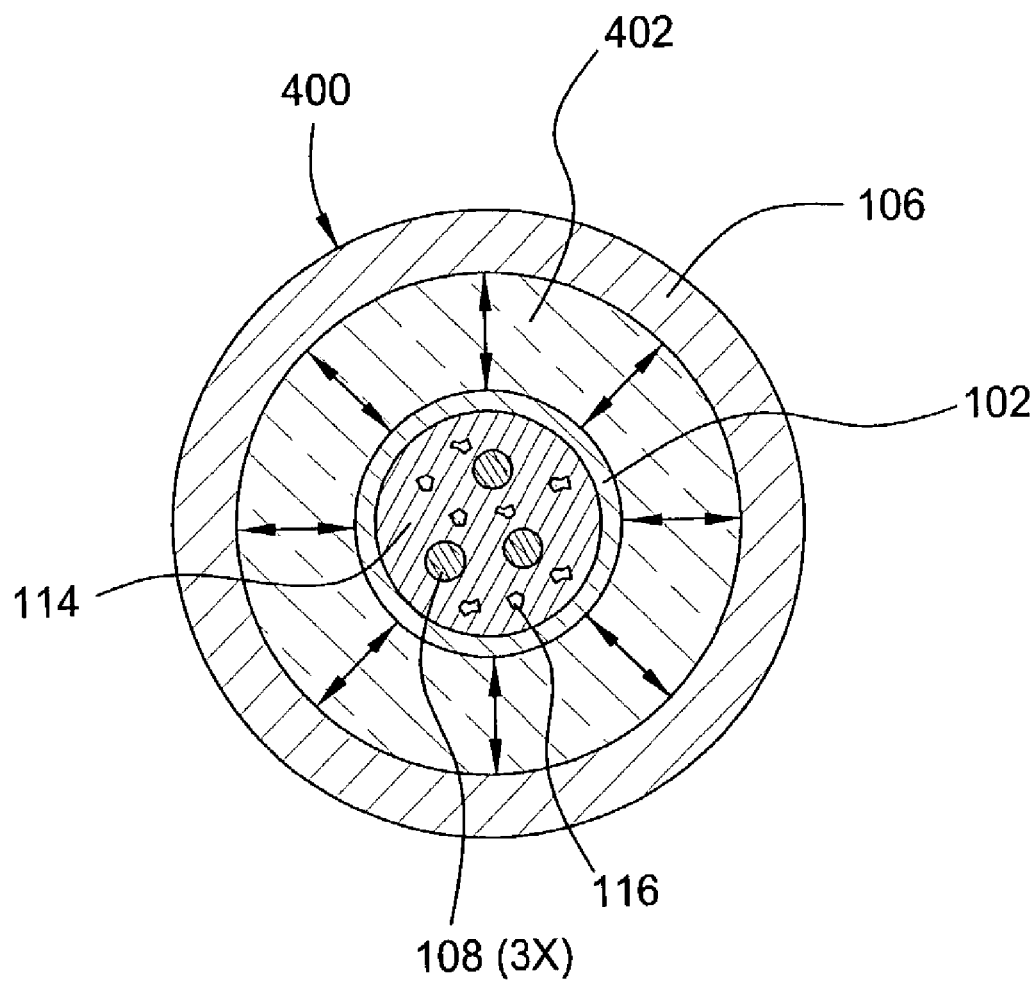
FIG. 4 is a cross sectional view of another embodiment of a fiber optic cable suitable for use in down hole oil and gas well applications.

FIG. 4 depicts another embodiment of a cross sectional view of another embodiment of a fiber optic cable 400 suitable for use in down hole oil and gas well applications. The cable 400 is substantially similar in construction to the cables described above, except that the cable 400 includes an expanded polymer spacer 402 that applies a force against an outer tube 104 and an FIMT core 102 that bound the spacer 402.

The polymer spacer 402 may be a foamed polymer, such as urethane or polypropylene. In one embodiment, the polymer spacer 402 may be injected and foamed between the outer tube 104 and the FIMT core 102 after the outer tube 104 has been welded. In another embodiment, the polymer spacer 402 may be disposed over the FIMT core 102 and compressed during a diameter reducing step applied to the outer tube 104 after the welding. In yet another embodiment, the polymer spacer 402 may be applied to the exterior of the FIMT core 102, and activated to expand between the outer tube 104 and the FIMT core 102 after welding. For example, the polymer spacer 402 may be heated by passing the cable 400 through an induction coil, where the heat generated by the induction coil causes the polymer spacer 402 to expand and fill the interstitial space between the outer tube 104 and the FIMT core 102. As the polymer spacer 402 is biased against both the outer tube 104 and the FIMT core 102, any well fluids that may breach the outer tube 104 is prevented from traveling along the length of the cable 400 between the outer tube 104 and the FIMT core 102.

Figure 5:
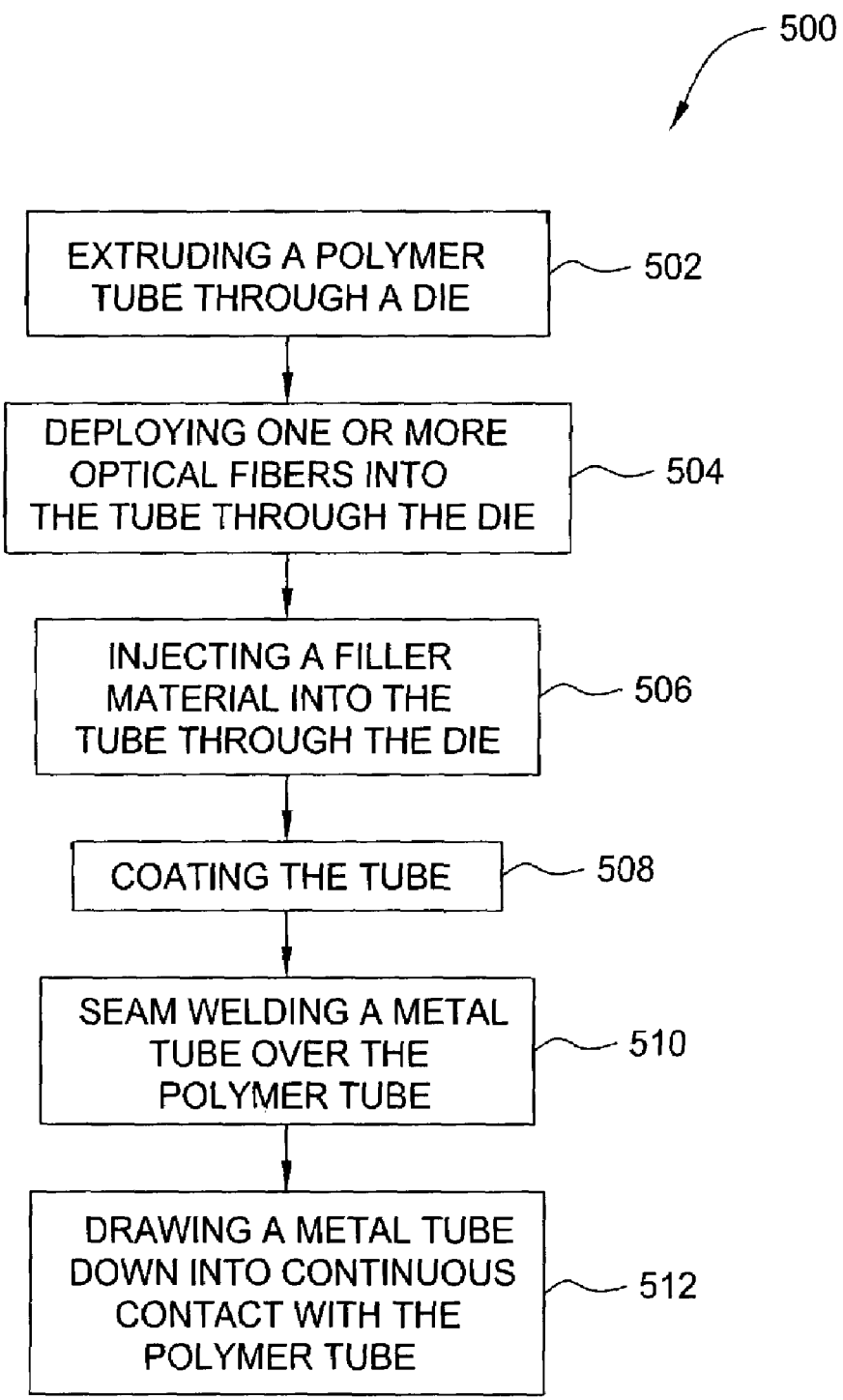
FIG. 5 flow diagram of one embodiment of a method for fabriacting a fiber optic cable suitable for use in down hole oil and gas well applications.
Figure 6:
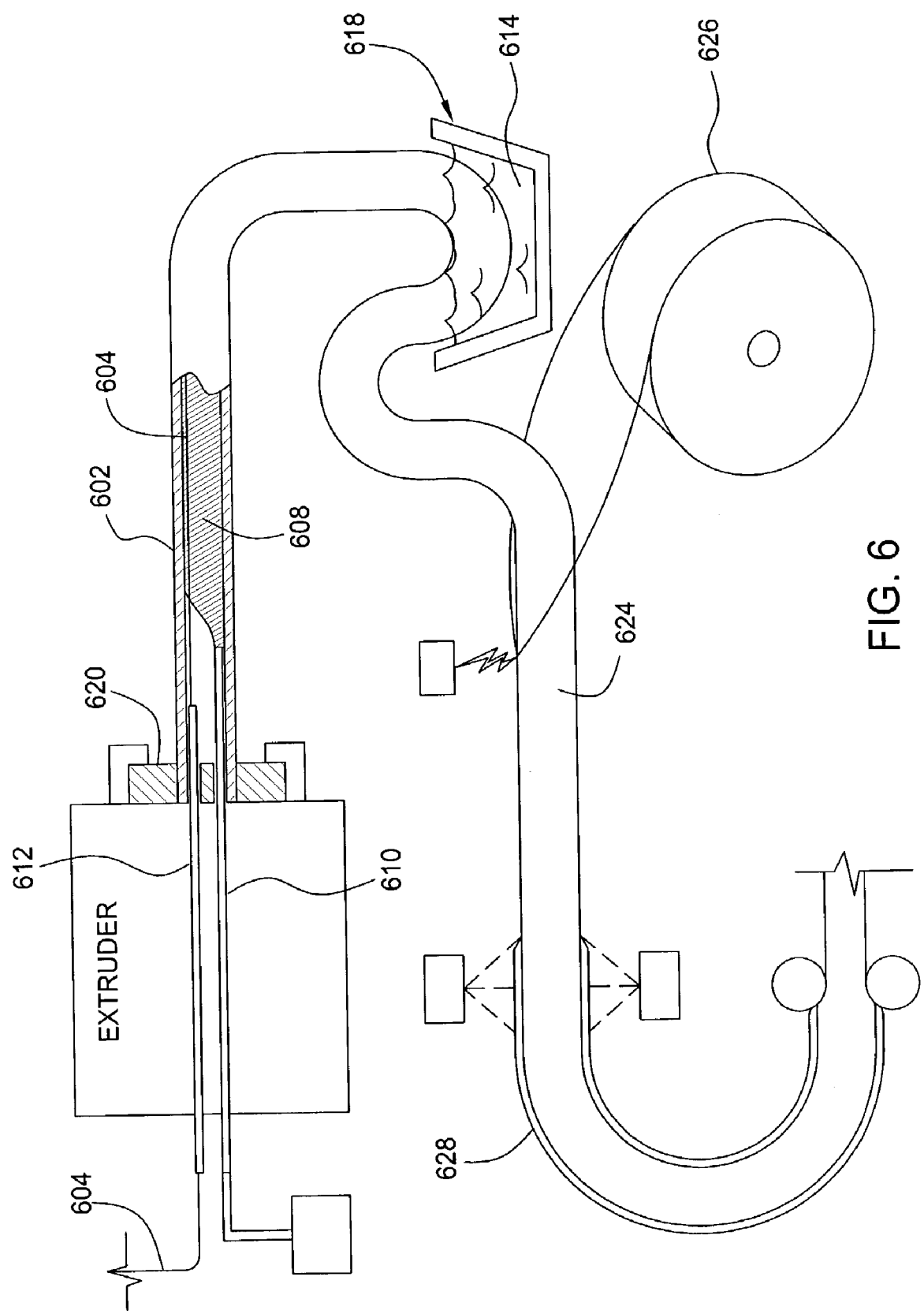
FIG. 6 is a simplified schematic of one embodiment of a fiber optic cable assembly line.
Figure 7:
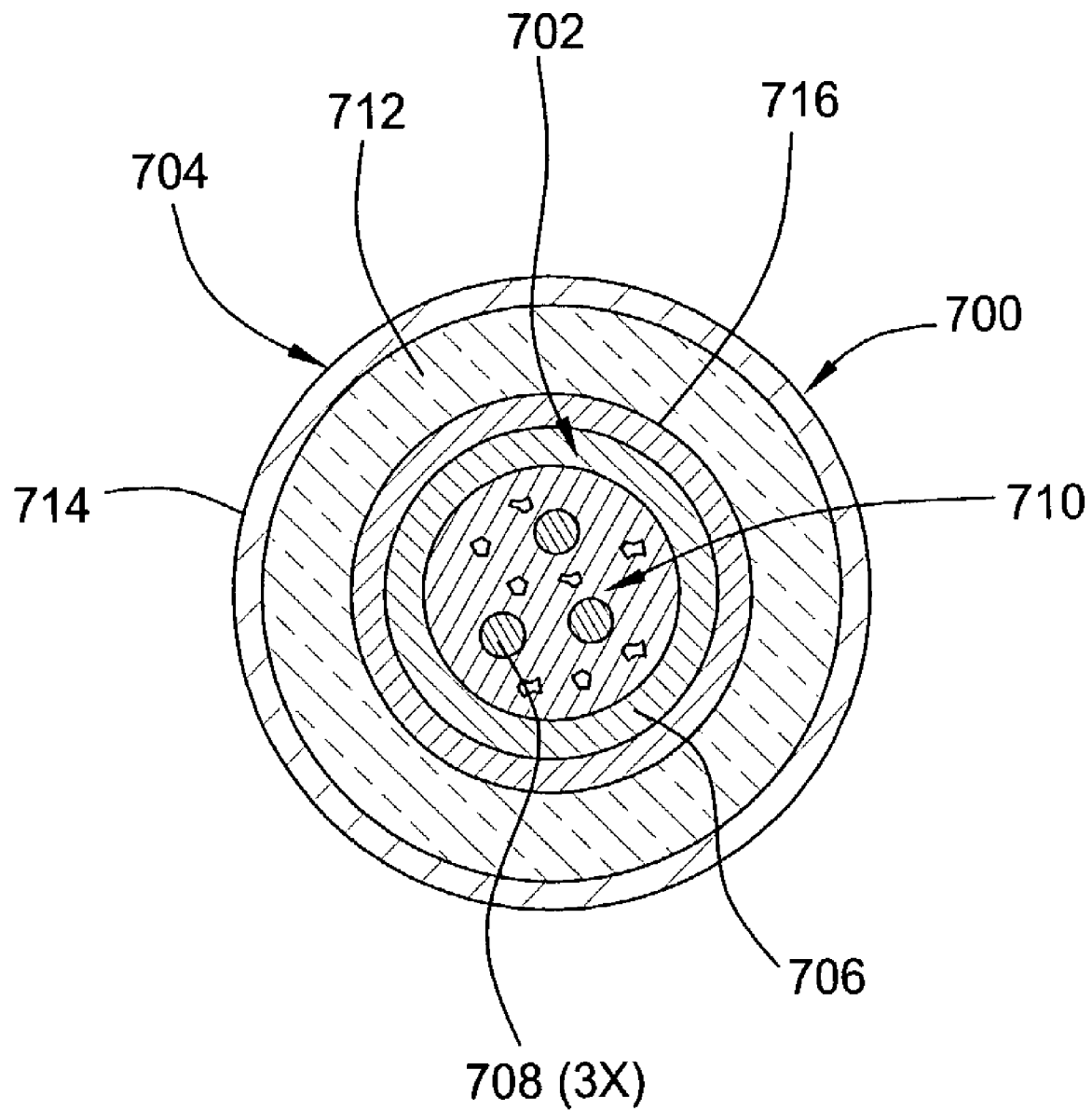
FIG. 7 depicts one example of a conventional fiber optic cable suitable for use in down hole oil and gas well applications.

FIGS. 5–6 are a flow diagram and simplified schematic of one embodiment of a method 500 for fabricating the optic cable 330. The reader is encouraged to refer to FIGS. 5–6 simultaneously.

The method 500 begins at step 502 by extruding a polymer tube 602 through a die 620 around at least one or more optical fibers 604. The optical fibers 604 may optionally be sheathed in a seam welded metal tube as described with reference to FIG. 1, and as described the previously incorporated in U.S. Pat. No. 6,404,961. As the polymer tube 602 is formed, the one or more optical fibers 604 are deployed from a first conduit or needle 612 extending through the die 620 into the tube 602 to a point downstream from the extruder 606 where the polymer comprising the tube 602 has sufficiently cooled to prevent sticking of the fibers 604 to the tube wall at step 504. The one or more optical fibers 604 are disposed in the tube 602 at a rate slightly greater than the rate of tube formation to ensure a greater length of optical fiber 604 per unit length of polymer tube 602.

At an optional step 506, a filler material 608 may be injected into the interior of the polymer tube 602 to fill the void spaces surrounding the optical fibers 604. The filler material 608 is injected from a second conduit or needle 610 extending through the die 620 of the polymer tube 602 to a suitable distance beyond the extruder to minimize any reaction between the cooling polymer tube 602 and the filler material 608. The filler material 608 may optionally be intermixed with a hydrogen absorbing/scavenging material.

At an optional step 508, the polymer tube 602 may be coated with a barrier material 614. The barrier material may be applied by plating, passing the tube 602 through a bath, spraying and the like. In one embodiment, the barrier material 614 is plated on the polymer tube 602 by passing the tube through one or more plating baths 618.

At an optional step 510, a protective outer sleeve 624 is formed around the polymer tube 602. The outer sleeve 624 may include seam welding a metal strip 626 to form the sleeve 624 around the polymer tube 602. The protective outer sleeve 624 may also include a polymer jacket 628 applied over the sleeve 624. The polymer jacket 628 may be formed by spraying or immersing the sleeve 624 in a polymer bath after welding. If a protective outer sleeve 624 is disposed over the polymer tube 602, the metal sleeve 624 may be drawn down into continuous contact with the polymer tube 602 at step 512.

Thus, a fiber optic cable suitable for use in harsh environments such as down hole oil and gas well applications has been provided. The novel optic cable has unique construction that advantageously minimizes fabrication costs. Moreover, as the novel optic cable has a reduced diameter that allows greater spooled lengths of cable facilitates more efficient utilization as compared to conventional cable designs, thereby minimizing the cost of optical sensing systems that utilize optic cables in down hole oil field applications.

Although the invention has been described and illustrated with respect to exemplary embodiments thereof, the foregoing and various other additions and omissions may be made therein and thereto without departing from the spirit and scope of the present invention.

What is claimed is:

1. An optic cable suitable for down hole oil field applications, comprising:
   an inner tube comprising a polymer sheath disposed over a metal tube;
   one or more optical fibers disposed in the inner tube; and
   a corrosion resistant metal outer tube disposed over the inner tube and making intermittent contact therewith, wherein the intermittent contact mechanically retains the inner tube relative to the outer tube due to frictional contact.

2. The optic cable of claim 1, wherein an outer diameter of the inner tube has a different geometrical shape than an inner diameter the outer tube.

3. The optic cable of claim 1 further comprising:
   a filler material disposed between the one or more optical fibers and the inner tube.

4. The optic cable of claim 3, wherein the filler material disposed between the one or more optical fibers and the inner tube further comprises:
   a viscous material; and
   at least one of a hydrogen absorbing or hydrogen scavenging material intermixed in the viscous material.

5. The optic cable of claim 1 further comprising:
   a low hydrogen permeable coating disposed on the inner tube.

6. The optic cable of claim 5, wherein the low hydrogen permeable coating further comprises:
   a nickel seed layer disposed on the inner tube;
   a layer of low hydrogen permeable material disposed on the seed layer; and
   a nickel layer disposed over the low hydrogen permeable material layer.

7. The optic cable of claim 5, wherein the low hydrogen permeable coating further comprises at least one of tin, gold or carbon.

8. The optic cable of claim 5 further comprising:
   a polymer layer disposed on the low hydrogen permeable coating.

9. The optic cable of claim 1, wherein the polymer sheath further comprises a plurality of fins extending outwardly therefrom.

10. The optic cable of claim 1, wherein the outer tube has a diameter less than about 3/16 inch.

11. The optic fiber of claim 1 further comprising a radially compressed polymer disposed between the inner tube and the outer tube.

12. An optic cable suitable for down hole oil field applications, comprising:
   a metal outer tube;
   a polymer tube disposed within the outer tube and having a plurality of fins extending outwardly therefrom and mechanically coupling with the metal outer tube to substantially prevent movement of the polymer tube within the metal outer tube; and
   one or more optical fibers disposed in the polymer tube, wherein the cable includes a greater length of optical fibers per unit length of polymer tube.

13. The optic cable of claim 12 further comprising:
   a filler material disposed between the one or more optical fibers and the polymer tube.

14. The optic cable of claim 13, wherein the filler material disposed between the one or more optical fibers and the inner tube further comprises:
   a viscous material; and
   at least one of a hydrogen absorbing or hydrogen scavenging material intermixed in the viscous material.

15. The optic cable of claim 12 further comprising:
   a low hydrogen permeable coating disposed on the polymer tube.

16. The optic cable of claim 15, wherein the low hydrogen permeable coating further comprises:
   a nickel seed layer disposed on the inner tube;
   a layer of low hydrogen permeable material disposed on the seed layer; and
   a nickel layer disposed over the low hydrogen permeable material layer.

17. The optic cable of claim 15, wherein the low hydrogen permeable coating further comprises at least one of tin, gold or carbon.

18. The optic cable of claim 12 further comprising:
   a seam welded corrosion resistant metal tube disposed between the polymer tube and the one or more optical fibers.

19. The optic cable of claim 18, wherein the metal tube further comprises:
   a low hydrogen permeable coating disposed thereon.

20. The optic cable of claim 12, wherein the fins extend form the polymer tube to a diameter less than about 3/16 inch.

21. An optic cable suitable for down hole oil field applications, comprising:

a metal outer tube;
a polymer tube disposed within the outer tube and having a different shape than an inner diameter of the metal outer tube, wherein a perimeter of the polymer tube lying in a cross sectional plane of the polymer tube intermittently contacts the inner diameter of the metal outer tube to mechanically engage the metal outer tube and secure the polymer tube and the outer tube relative to one another;

one or more optical fibers disposed in the polymer tube, wherein the cable includes a greater length of optical fibers per unit length of polymer tube; and a viscous filler material disposed between the one or more optical fibers and the inner tube, wherein a hydrogen absorbing material is intermixed in the filler material.

* * * * *